June 17, 1958 | J. G. DWYER | 2,838,932
ANEMOMETER
Filed Feb. 10, 1954
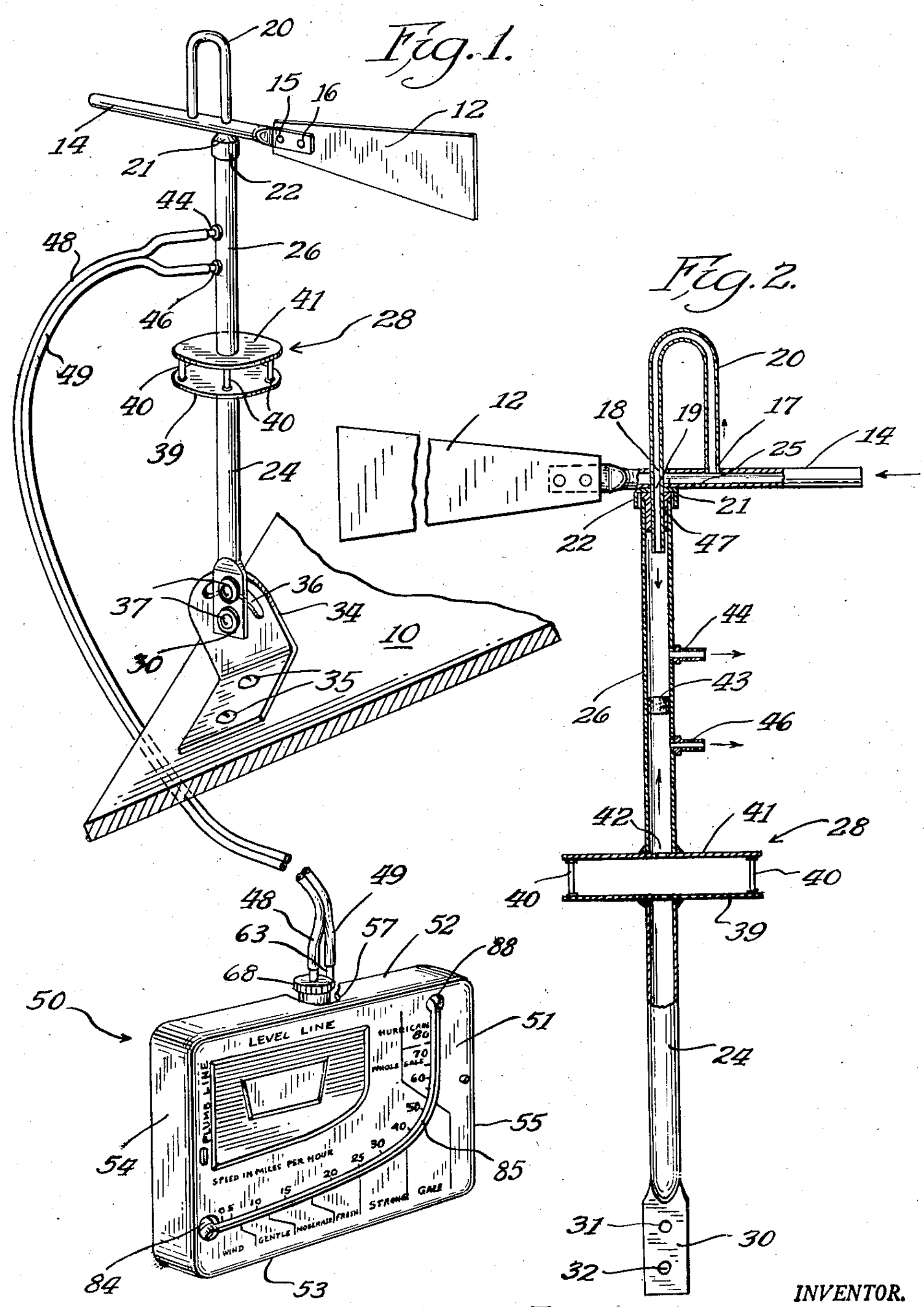
INVENTOR.
James G. Dwyer
BY
Mann, Brown and Hansmann.
ATTYS.

United States Patent Office 2,838,932

Patented June 17, 1958

2,838,932

ANEMOMETER

James G. Dwyer, Deerfield, Ill., assignor to F. W. Dwyer Mfg. Co., a corporation of Illinois Application February 10, 1954, Serial No. 409,443

6 Claims. (Cl. 73—189)

Due to the important part that weather conditions play in our everyday life, people of all ages have long expressed a keen interest in this subject. Weather conditions past, present and future are discussed every day in our newspapers, on radio and television, and among the people themselves.

This interest in the weather has been further evidenced by the many people who have installed weather instruments in and around their homes, such as thermometers, barometers, humidity gauges, and the like. Sharing the limelight with these instruments are various types of wind instruments. The familiar wind vane has long been considered a vital appointment of the home. The wind vane, however, is capable of indicating only wind direction and not wind speed.

Many devices for the measurement of wind speed have been tried but until this time none has been sufficiently dependable and accurate to produce useful indications of both wind speed and wind direction and yet that is economical enough to appeal to the average home owner.

Accordingly, it is the principal object of the present invention to provide an anemometer that is primarily adapted for home use; that is of sturdy and economical design and construction; that is remarkably accurate; that is relatively invulnerable to the effects of ice, snow, rain, etc.; and that is easy to locate, install and adjust.

Other objects and advantages of the invention will be apparent during the course of the following description.

In the accompanying drawings, forming a part of this specification, and in which like numerals are employed to designate like parts throughout the same:

Fig. 1 is a perspective view of the complete assemblage of the anemometer of the present invention; and Fig. 2 is a vertical sectional view of the Pitot tube-wind vane assembly.

It should be understood that the description of the preferred form of the invention is for the purpose of complying with section 112, title 35 of the United States Code, and that the appended claims should be construed as broadly as the prior art will permit.

Referring now to Fig. 1, the anemometer of the present invention comprises a Pitot tube-wind vane assembly mounted on the roof 10 of a house, a manometer-type indicating device adapted to be mounted within the house, and a pair of pressure lines connected therebetween. The wind vane 12, which may be made of vinyl plastic, indicates the direction of the wind and also faces the Pitot tube 14 into the wind. In this position the Pitot tube 14 translates the wind velocity into static pressure in a manner well known in the art. A pair of steel rivets 15, 16 secures the wind vane to the Pitot tube.

The Pitot tube 14 is provided with a conventional pinhole drain 25, a pair of spaced holes 17 and 18 in its upper wall and an additional hole 19 in its lower wall. The hole 19 is in register with the hole 18. A generally U-shaped weather trap 20 consisting of a hollow tube having one leg somewhat longer than the other is fitted into these holes in an airtight relationship. The shorter leg of the weather trap is received in the hole 17 and the longer leg passes through the holes 18 and 19. A round bearing plate 21 having a depending circumferential skirt 22 is telescoped over the extension of the longer leg of the U-shaped weather trap 20. The Pitot tube 14, weather trap 20 and plate 21 may be soft soldered to provide a rigid airtight assembly.

This entire assembly is adapted to be rotatably mounted on a mast comprising a bottom tube 24, an upper tube 26 and a balance plate assembly, designated generally at 28, therebetween.

At its lower end, the bottom tube is pressed flat to form a mounting pad 30 having a pair of mounting holes 31 and 32. A right-angled mounting bracket 34 is adapted to receive the mounting pad 30 of the bottom tube. One leg of the mounting bracket is secured to the roof by a pair of wood screws 35 and the other leg, which is provided with an arcuate slot 36 subtending an angle of substantially 90° and a hole at the center of curvature thereof, receives the mounting pad 30. The pad is secured by nuts, bolts and washers, as shown at 37, and may be rotated throughout the range of the slot 36.

The mast which supports the weather vane assembly must at all times be vertically aligned. The provision of the arcuate slot 36 permits this irrespective of the slope of the roof. In addition, it is possible to locate the mounting bracket on the side of a wall, or on a post, or it could even be clamped to a television aerial.

The bottom tube 24 is secured to a flat circular lower plate 39 preferably by resistance welding. A series of spacing pins 40 welded at one end to the lower plate 39 and at the other end to a corresponding flat circular upper plate 41 maintains the plates in a spaced parallel relationship. The upper tube is secured to and supported by the upper plate 41, at the center thereof as by resistance welding, and communicates with the region between the plates through a central aperture 42 provided in the upper plate. Within the upper tube 26 is positioned a rubber stopper 43 above which is located an upper tubing connector 44 that communicates with the top half of the upper tube 26 and the Pitot tube, and below which is located a lower tubing connector 46 that communicates with the lower half of the upper tube 26 and the region between the plates 39 and 41.

At its top, the upper tube receives a bushing 47, such, for example, as nylon, which has the desirable property of being self-lubricating. Other materials may, of course, be used, such, for example, as lubricant-packed sintered brass or bronze. The longer leg of the weather trap 20 is telescoped within the bushing 47 and the upper tube 26 of the mast assembly so that the bearing plate 21 rests upon the bushing 47. In this relationship the Pitot tube is in airtight communication with the mast, and, in addition, is freely rotatable about the mast. The weather trap 20 maintains this airtight communication unimpaired but prevents any snow, ice and rain which may enter the Pitot tube 14 from reaching the mast assembly. Also, the depending skirt 22 of the bearing plate 21 shields the junction of the weather vane and mast assemblies from the weather.

When this entire assembly is mounted on the roof of a house, the force of the wind on the wind vane 12 will face the Pitot tube 14 into the wind. The action of the Pitot tube translates the wind velocity into static pressure. The static pressure line consists of the Pitot tube 14, the weather trap 20, the top part of the upper tube 26, the upper tubing connector 44 and the tubing 48 which is connected between the upper tubing connector 44 and the reservoir of the manometer indicator.

Simultaneously, the wind passes between the flat, horizontally disposed plates 39 and 41. The plate assembly, as described, creates little or no disturbance in the path and velocity of the wind. The adjacent surfaces of the plates are smooth and parallel and a minimum number of spacing pins 40 are employed. The central aperture 42 of the upper balance plate 41 is in communication with the region between the plates which represents the true wind conditions of the outside air, but since it is perpendicular to the direction of the wind, it is not affected by the wind velocity. Thus, the bottom half of the upper tube 26 is in communication with and reflects the true static pressure of the outside air and is independent of the wind velocity. This balancing static pressure line consists of the aperture 42, the bottom half of the upper tube 26, the lower tubing connector 46 and the tubing 49 which is connected between the lower tubing connector 46 and the static arm of the manometer indicator.

The pressure differential which the manometer receives, that is, the difference between the pressure in the tubing 48 and the pressure in the tubing 49, is truly determined by the speed of the wind.

The manometer indicator consists of a molded polystyrene case, designated generally at 50, having a substantially flat face 51, and top, bottom and side perimetric walls designated 52, 53, 54 and 55, respectively. These perimetric walls define an interior portion of the case 50 in which a cylindrical fluid reservoir is mounted to project through a notch 57 provided in the upper wall 52 of the casing. The reservoir is fitted at its open top with a knurled combination plug and tubing connector 68 to which the tubing 48 of the static pressure line is attached. As is conventional, the reservoir feeds a manometer arm 85. Similarly, the tubing 49, which communicates with the region between the plates 39 and 41, is joined by means of a connector 63 to the upper or free end of the manometer arm 85. The arm 85 is inclined in the manner illustrated in Fig. 1 to spread out the scale, and it is preferably mounted in countersunk relation in the face 51 of the case 50. As indicated generally, this arm 85 is brought through openings 84 and 88 provided in the case at the opposite extremities of the arm.

In the operation of the anemometer of the present invention, the Pitot tube wind vane assembly is mounted on a roof 10 in the vertical position, as previously described. The manometer case 50 is mounted at a suitable location inside a housing, and its reservoir is supplied with gauge fluid. The tubing 48 which communicates with a Pitot tube 14 is then joined to connector 68 of the reservoir, and the tubing 49 which communicates with the region between the plates 39 and 41 is joined to the connector 63, which communicates with the upper, or free, end of the manometer arm.

When the wind blows and exerts a force on the wind vane 12, the Pitot tube 14 is caused to point into the wind thereby indicating the wind direction in the usual manner. In this position, the Pitot tube also translates the wind speed into static pressure. Simultaneously, the wind passes between the balance plates without appreciable disturbance so that the true outside static pressure appears therebetween.

The difference between these static pressures represents the true static pressure due to the wind. This difference acts on the gauge fluid in the reservoir and forces it upwardly in the indicating manometer arm. The calibrated scale measures the wind speed in miles per hour or in inches of water.

Thus it may be seen that the anemometer of the present invention fulfills the objects of the present invention. The anemometer includes a built-in leveling device and adjustable mounting bracket to facilitate its installation and adjustment; a zero level adjustment to maintain its accuracy; a weather trap and a bearing shield to protect it from the elements; and a balancing static pressure line which is responsible for its remarkable accuracy. In addition, its overall design makes it a sturdy and economical device.

I claim:

1. In an assembly comprising a Pitot tube and a hollow supporting tube serving as a mast for said Pitot tube and communicating therewith, the improvement in the mast wherein it is formed with a lower portion, a flat lower horizontal plate secured to said lower portion, a flat upper horizontal plate having an aperture therein, means spacing said plates, and an upper tube portion secured to said upper plate and communicating by means of said aperture with the region between said plates, said upper tube portion including intermediate stop means therein isolating the top and bottom parts thereof, the arrangement being such that the top part of the upper tube is subjected to velocity pressure and the bottom part of the upper tube is subjected to static pressure.

2. In an assembly comprising a Pitot tube and a hollow supporting tube serving as a mast for said Pitot tube and communicating therewith, the improvement in the mast comprising a pair of vertically spaced parallel horizontal plates, said plates dividing the mast into an upper tube portion and a lower tube portion and the upper plate having an aperture therethrough, said upper tube portion communicating with the region between the parallel plates through the aperture in the upper plate, a stopper within said upper tube portion isolating the top and bottom parts thereof, the arrangement being such that the top part of the upper tube portion is subjected to velocity pressure and the bottom part of the upper tube portion is subjected to static pressure.

3. In an instrument comprising a Pitot tube and a wind vane carried thereby, the improvement comprising an inverted U-shaped tube mounted on said Pitot tube and having one leg in communication therewith, the other leg being adapted to be connected to a pressure-indicating device.

4. In an instrument comprising a Pitot tube and a wind vane carried thereby, the improvement comprising an inverted U-shaped tube mounted on said Pitot tube and having one leg in communication therewith, the other leg being adapted to be connected to a pressure-indicating device, said Pitot tube being provided with a drain hole at the bottomside thereof.

5. An assembly comprising a Pitot tube and a mast supporting said tube and communicating therewith, said mast comprising a hollow lower portion, a hollow upper portion, horizontal plates secured to the adjacent ends of said portions, means spacing said plates vertically, and means isolating the top of said upper portion from the region between said plates, one of said plates having an aperture such that the hollow mast portion secured thereto is subjected to static pressure while the top of said upper portion is subjected to velocity pressure.

6. In an instrument comprising a Pitot tube and a wind vane carried thereby, the improvement comprising a pair of tubes mounted on and extending upwardly from said Pitot tube with one tube of said pair communicating with said Pitot tube and the other tube of said pair being adapted to be connected to a pressure indicating device, said pair of tubes being connected at their upper ends.

References Cited in the file of this patent

UNITED STATES PATENTS

| | | |
|---|---|---|
| 1,034,399 | Buck | July 30, 1912 |
| 1,130,689 | Atkinson | Mar. 2, 1915 |
| 1,169,795 | Gebhardt | Feb. 1, 1916 |
| 1,410,325 | Kupferman | Mar. 21, 1922 |
| 1,897,658 | Apthorp | Feb. 14, 1933 |
| 1,935,246 | Kirsch | Nov. 14, 1933 |
| 2,038,777 | Wilcox | Apr. 28, 1936 |
| 2,042,700 | Colvin | June 2, 1936 |
| 2,554,634 | Paine et al. | May 29, 1951 |
| 2,586,010 | Divoll | Feb. 19, 1952 |
| 2,628,807 | Lincoln | Feb. 17, 1953 |
| 2,719,739 | Copeland | Oct. 4, 1955 |

FOREIGN PATENTS

| | | |
|---|---|---|
| 216,592 | Great Britain | June 4, 1924 |
| 596,608 | Great Britain | Jan. 7, 1948 |